United States Patent
Liu et al.

(10) Patent No.: US 7,969,869 B2
(45) Date of Patent: *Jun. 28, 2011

(54) METHOD AND APPARATUS FOR FAILURE RESILIENT FORWARDING OF DATA OVER A COMPUTER NETWORK

(75) Inventors: Zhen Liu, Tarrytown, NY (US); Sambit Sahu, Mahopac, NY (US); Jeremy I. Silber, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 342 days.

This patent is subject to a terminal disclaimer.

(21) Appl. No.: 12/135,764

(22) Filed: Jun. 9, 2008

(65) Prior Publication Data

US 2008/0239947 A1    Oct. 2, 2008

Related U.S. Application Data

(62) Division of application No. 10/830,779, filed on Apr. 23, 2004, now Pat. No. 7,392,319.

(51) Int. Cl.
*H04L 12/26* (2006.01)
(52) U.S. Cl. .................................................. 370/218
(58) Field of Classification Search .............. 370/230, 370/230.1, 135, 236, 236.1, 236.2, 237, 238, 370/226, 227, 217–218, 221, 225, 228, 394, 370/503–505, 509, 510, 512–515; 709/250; 710/1, 52; 714/18, 746–752

See application file for complete search history.

(56) References Cited

U.S. PATENT DOCUMENTS

| | | | |
|---|---|---|---|
| 5,754,754 A * | 5/1998 | Dudley et al. ................... 714/18 |
| 6,219,349 B1 * | 4/2001 | Kobayashi et al. ......... 370/395.6 |
| 6,230,215 B1 | 5/2001 | Fadavi-Ardekani et al. |
| 6,442,663 B1 | 8/2002 | Sun et al. |
| 6,543,014 B1 * | 4/2003 | Okuyama et al. ............. 370/412 |
| 6,556,577 B2 * | 4/2003 | Hjalmtysson et al. ........ 370/410 |
| 6,862,283 B2 * | 3/2005 | Marietta et al. .............. 370/394 |
| 7,206,872 B2 | 4/2007 | Chen |
| 2003/0172335 A1 | 9/2003 | Das Sharma |
| 2004/0128399 A1 | 7/2004 | Kurrasch |

* cited by examiner

*Primary Examiner* — Melvin Marcelo

(57) ABSTRACT

In one embodiment, a method and an apparatus for failure-resilient forwarding of data over a computer network include introducing a marker into the data stream, e.g., at the sending node, and allowing, in turn, forwarding nodes and/or receivers to efficiently track data stream reception. The marker functions as a checkpoint for the data transport process, and is identified and indexed at each forwarding node and receiver. Each receiver saves the marker prior to delivering data to an application, thereby designating a point in the data stream at which all preceding data is confirmed to have been delivered to the application. Thus, if a forwarding node fails, the receiver may request stream data from an alternate forwarding node by specifying to the alternate forwarding node to provide data starting from the marker.

20 Claims, 5 Drawing Sheets

| MARKER | IDENTIFIER | LOCAL BUFFER POSITION |
|---|---|---|
| $M_1$ | 1 | $L_1$ |
| $M_2$ | 2 | $L_2$ |
| $M_3$ | 3 | $L_3$ |

METHOD AND APPARATUS FOR FAILURE RESILIENT FORWARDING OF DATA OVER A COMPUTER NETWORK

CROSS REFERENCE TO RELATED APPLICATIONS

This application is a divisional of U.S. patent application Ser. No. 10/830,779, filed Apr. 23, 2004, now U.S. Pat. No. 7,392,319, which is herein incorporated by reference in its entirety.

BACKGROUND

The present invention relates generally to computer systems and computer networks, and relates more particularly to content delivery over computer networks. Specifically, the present invention relates to a method and apparatus for adaptive forwarding of data over a computer network.

FIG. 1 is a schematic illustration of one embodiment of a system 100 for forwarding data over a network. A wide range of end-to-end computing applications (including overlay networks, end-system multicast, proxy servers, network address translation and protocol tunneling, among others) use intermediaries, or forwarding nodes $106_1$-$106_n$ (e.g., computing devices or routers), to route a stream 112 of data from a sender 102 (e.g., a server) to one or more receivers 104. Receivers 104 may in turn deliver the data to one or more computing applications 108.

A typical problem with a system such as the system 100 is that a failure or disruption at any forwarding node disrupts the end-to-end chain, resulting in incomplete data delivery to the receiver(s). This is especially troublesome for large networks, as the probability of node failure increases with the number of forwarding nodes implemented. Conventional solutions for addressing node failure in a forwarding network include source-based repair such as a Transmission Control Protocol/Internet Protocol (TCP/IP) session between the data source and the receiver, packet number-based retransmission requests, and various application- and content-specific resiliency schemes (e.g., resuming File Transport Protocol at a specific byte offset from the start of a file, or resuming a video transmission at a specific frame number). However, these conventional solutions are subject to a number of limitations, including scalability limitations and the inability to adapt for use over a network using heterogeneous transports or delivering generic (non-content-specific) data streams. Accordingly, they are not appropriate for delivering data over an adaptively changing network using multiple point-to-point protocols in a content-independent manner.

Thus, there is a need for a method and apparatus for failure-resilient forwarding of data over a computer network.

SUMMARY OF THE INVENTION

In one embodiment, the present invention is a method and an apparatus for failure-resilient forwarding of data over a computer network. In one embodiment, a marker is introduced into the data stream, e.g., at the sending node and, in turn, allows forwarding nodes and/or receivers to efficiently track data stream reception. The marker functions as a checkpoint for the data transport process, and is identified and indexed at each forwarding node and receiver. Each receiver saves the marker prior to delivering data to an application, thereby designating a point in the data stream at which all preceding data is confirmed to have been delivered to the application. Thus, if a forwarding node fails, the receiver may request stream data from an alternate forwarding node by specifying to the alternate forwarding node to provide data starting from the marker.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

The present invention is a method and an apparatus for failure-resilient forwarding of data over a computer network. In one embodiment, a trigger condition, such as forwarding node failure, performance degradation, query, resource use imbalance and the like, initiates a network adaptation to correctly resume transmission reception of a data stream.

Figure 1:
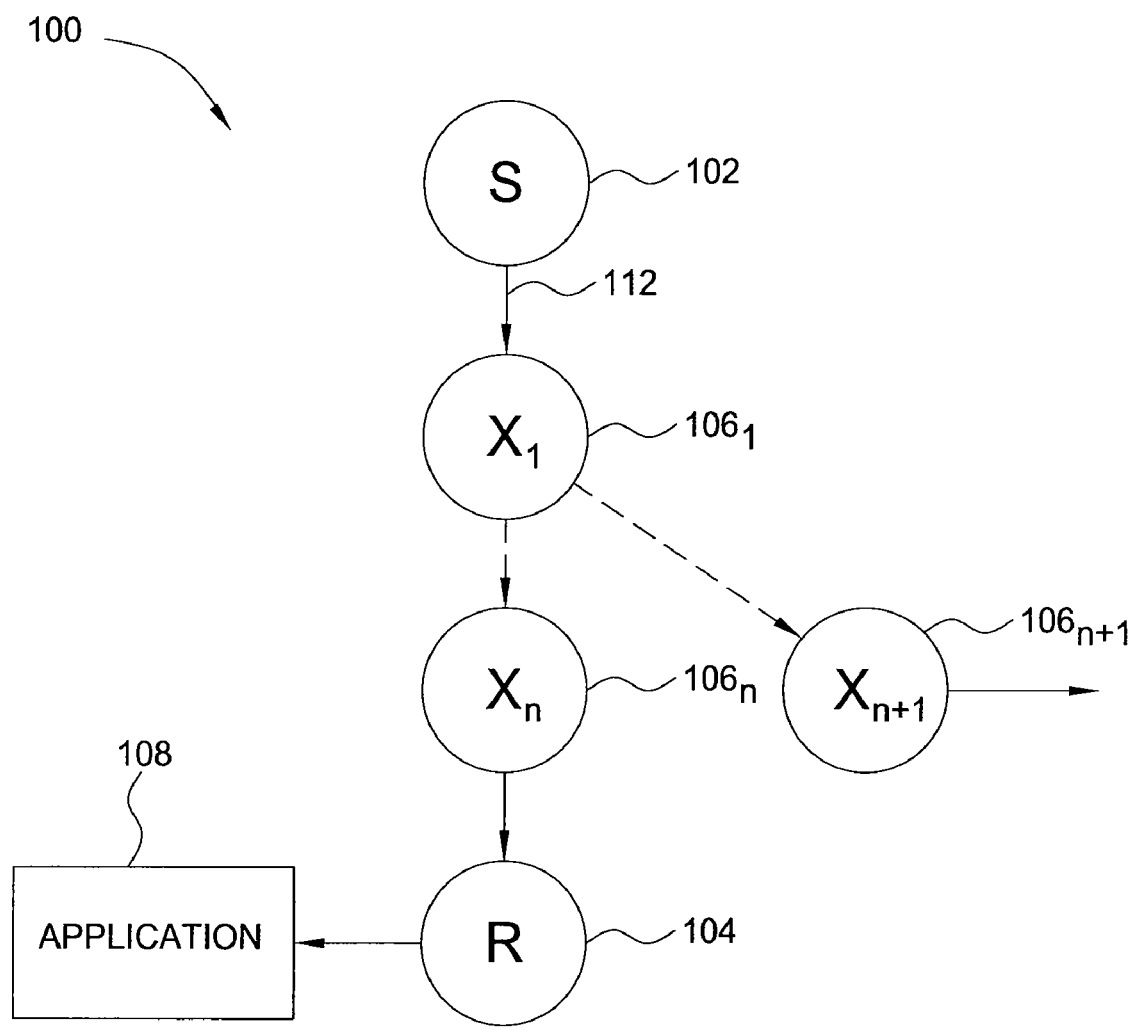
FIG. 1 is a schematic illustration of one embodiment of an end-to-end computing network.
Figure 2:
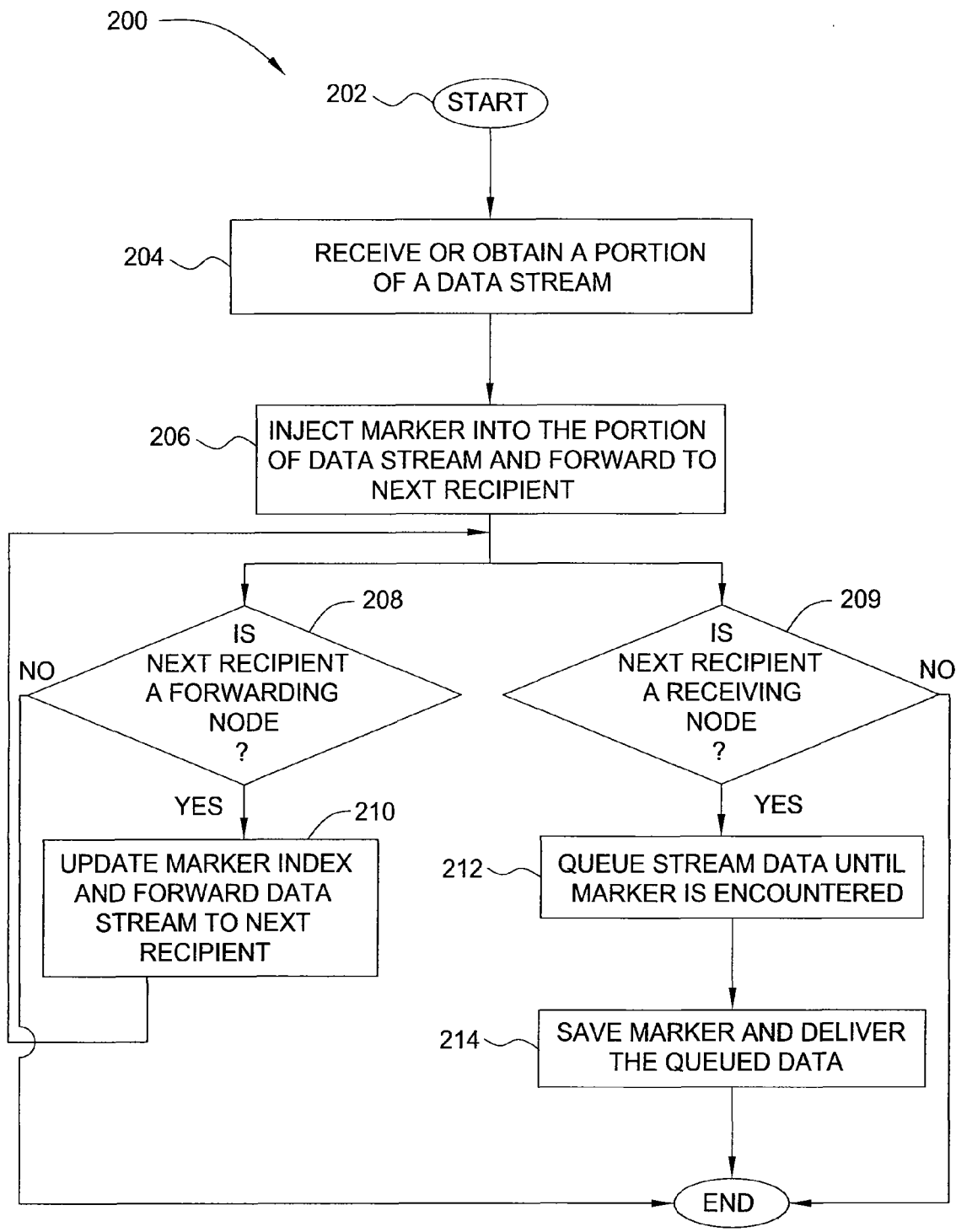
FIG. 2 is a flow diagram illustrating one embodiment of a method for enabling failure-resilient forwarding of data from a sender to one or more receivers according to the present invention.

FIG. 2 is a flow diagram illustrating the flow of data through one embodiment of a method 200 for enabling failure-resilient forwarding of data from a sender to one or more receivers according to the present invention. The method 200 is initialized at step 202 and proceeds to step 204, where a sending node or a forwarding node (e.g., sender 102 or any one of the forwarding nodes 106 of FIG. 1) obtains (in the case of the sender) or receives (in the case of the forwarding node) at least a portion of a data stream. In one embodiment, the data stream may simply be a portion or an arbitrarily sized data segment of a much larger data stream. Namely, a sequence of "chunks" or "portions" of the larger data stream is being sent from the sending node to a receiving node. In step 206, the sender or a forwarding node injects a marker into the portion of the data stream, and forwards the "marked" data stream, with or without further modification, to one or more next recipient nodes in the network (e.g., one or more subsequent forwarding nodes or receiving nodes) via a point-to-point reliable transport protocol (e.g., a protocol that is packet loss resilient, such as TCP/IP and the like). The marker designates a reference point in the generic data stream and in one embodiment is a recognizable bit field with a unique identifier. The marker may be recognized by reserved bit sequences, fixed inter-marker offsets, or an offset specified by a prior marker. Thus, markers may be periodically injected into the data stream, so that a plurality of marked data streams is transported through the network.

After injecting the marker in step 206, the method 200 branches off into at least one of two possible subsequent processes. In steps 208-210, the method executes steps in accordance with the function of a forwarding node; in steps 209-214, the method 200 executes steps in accordance with the function of a receiving node.

In step 208, the method 200 inquires if the recipient of the marked data stream is a forwarding node. If the method 200 determines that the recipient is forwarding node, the method 200 proceeds to step 210, where the method 200 inspects the received data stream, stores the data in a local buffer of the forwarding node, and creates or updates a marker index at the forwarding node. In one embodiment, the marker index that the method 200 updates comprises two key components: (1) a record of the most recently received marker; and (2) a record of each marker previously received and stored by the forwarding node. Once the method 200 has updated the marker index, the method 200 forwards the marked data stream to the next recipient(s) (e.g., one or more other forwarding nodes or receivers) in the network. The marked data stream is processed by the next recipient node(s) starting at the point in the method 200 just following step 206, as indicated by the loop from step 210. Thus, all forwarding nodes receive the marked data stream, relay the marked data stream to the next forwarding nodes or receivers, and index the markers.

Figure 3:
FIG. 3 is a table illustrating one method of distributing content using the system illustrated in FIG. 2.

FIG. 3 is a schematic illustration of one embodiment of a marker index 300 according to the present invention, such as the marker index updated by the method 200 in step 210 of FIG. 2. In one embodiment, the marker index 300 is a table. As illustrated, the marker index 300 stores, for each marker (e.g., markers $M_1$-$M_3$), the marker's unique identifier and its position in the local buffer. As will be further described below with reference to FIG. 4, this stored information may be used to recover data lost, for example, due to a forwarding node failure.

Referring back to FIG. 2, if the method 200 concludes at step 208 that the recipient of the marked data stream is not a forwarding node, the method 200 terminates.

Also after injecting the marker in step 206, the method 200 inquires in step 209 if the recipient is a receiving node. If the method 200 concludes that the recipient is a receiving node, the method 200 proceeds to step 212 and queues the stream data received by the receiver until the marker is encountered. In step 214, the method 200 saves the marker and delivers the queued data (i.e., all undelivered, non-marked data preceding the marker in the data stream) to a process desiring the original data stream (e.g., an application or a storage process). Alternatively, if the method 200 concludes in step 208 that the recipient is not a receiving node, the method 200 terminates.

In one embodiment, one or more nodes are both forwarding and receiving nodes. That is, a node may be adapted to both receive data for delivery to an application, and also to forward the received data on to another node. Thus, the node is capable of executing both the forwarding and the receiving methods contained within the method 200. Thus, although the forwarding and receiving processes (e.g., steps 208-210 and 209-214, respectively) are designated by sequential reference numerals, the reference numerals do not connote an order in which the processes occur. Therefore, those skilled in the art will appreciate that the forwarding and receiving methods are executed independently, and that the methods may actually occur simultaneously, or may occur one after the other in any order. Thus, the sequence of the reference numerals as they apply to steps 208-216 is not intended to be limiting in any sense.

Thus, the markers injected into the data stream represent checkpoints for the data transport process. By saving the markers at the receivers, the method 200 designates points in the data stream where all preceding data has been delivered, reliably and in order, to the waiting application. The method 200 also serves the function of designating points in the data stream where any succeeding data has yet to be delivered. This saved marker information may be used to recover data lost, for example, due to a forwarding node failure.

Figure 4:
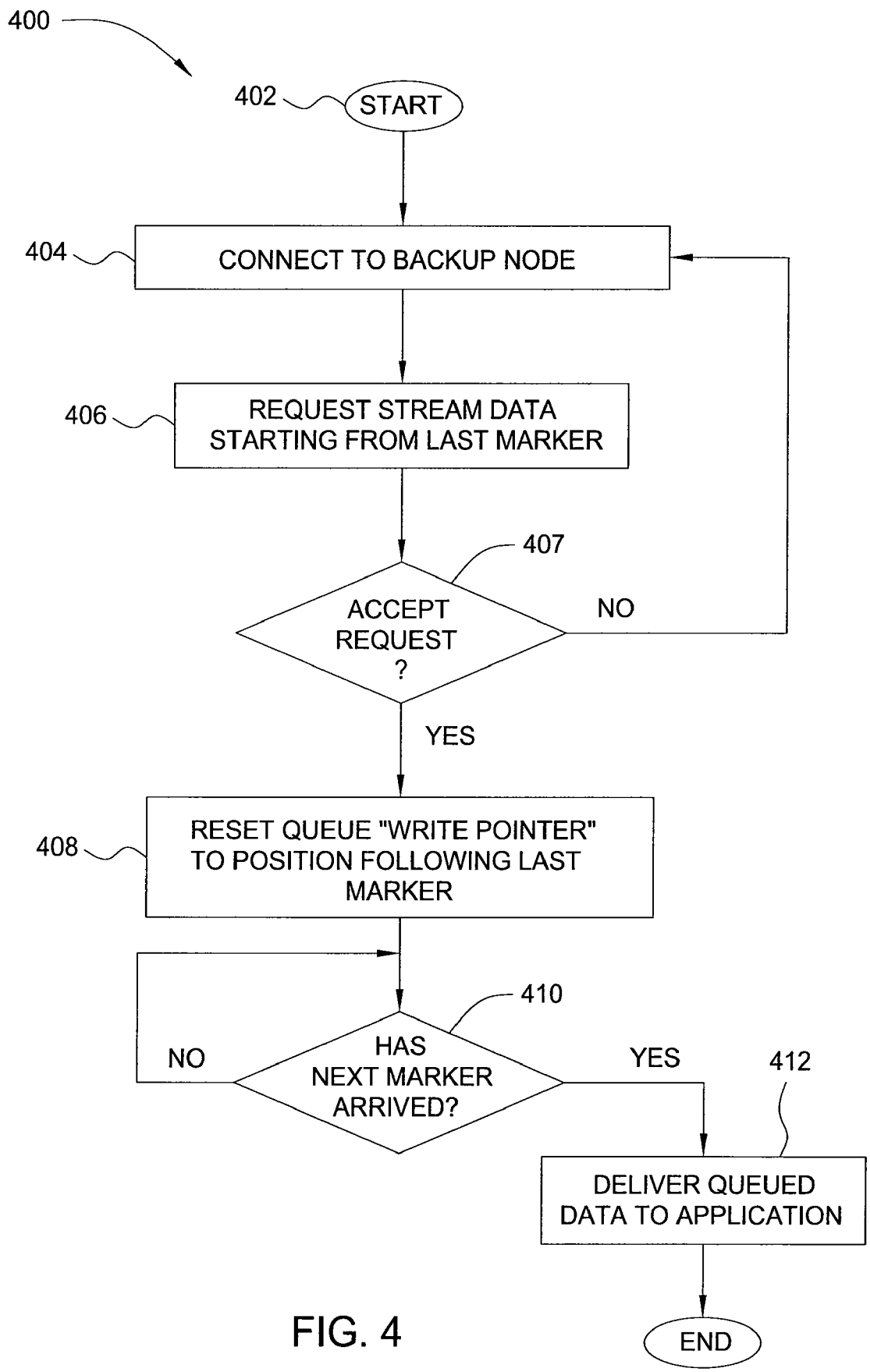
FIG. 4 is a flow diagram illustrating one embodiment of a method for recovering lost data in a data stream.

FIG. 4 is a flow diagram illustrating one embodiment of a method 400 for recovering lost data in a data stream. For example, the method 400 may be executed in the event that a forwarding node (e.g., a forwarding node 106 of FIG. 1) fails (e.g., due to disconnection from the network or power failure) and thus ceases to forward data to subsequent recipients. The method 400 is initialized at step 402 and proceeds to step 404, where the method 400 identifies a forwarding node failure and connects a receiver (or subsequent forwarding node) to an alternate forwarding node, or a "backup node" (e.g., a node that preceded the failed node in the routing path). Alternatively, the method 400 may connect the receiver to any "sister" node of the failed forwarding node that is still receiving the data stream. In one embodiment, the backup node is selected for efficiency. For example, if the failed node is node $X_n$ in FIG. 1, then the backup node can be selected to be node $X_1$ or node $X_{n+1}$. The selection of the proper node can be based on distance, delay, computational cost and the like.

The method 400 then proceeds to step 406, where the method 400 requests, from the backup node, the stream data starting from the last marker, M, saved by the receiver. In an alternative embodiment, the method 400 may request the stream data starting from a specified position after the last marker M (e.g., three bits after the marker M). The request includes the unique identifier for the marker M. In step 407, the method 400 inquires if the backup node will accept the request presented in step 406. If the backup node rejects the request, the method 400 returns to step 404 and connects to another backup node. Alternatively, if the backup node accepts the request in step 407, the method 400 enables the backup node to look up the marker M in the backup node's marker index. If the marker M is present, the backup node begins sending the marked data stream, using the location of the marker M in its local buffer as the starting point. In one embodiment, any data residing in the local buffer past the point of the marker M is discarded.

In step 408, the method 400 resets a queue "write pointer" for the receiver to a position immediately following the marker M. The method 400 also erases data following the write pointer in the local buffer, and the receiver will now start queuing data over the new connection from the new forwarding node. As the marked data stream arrives at the receiver over the new connection from the backup node, the arriving data stream overwrites any data following the marker M in the receiver's local buffer. In an alternative embodiment, the method 400 may request discrete portions of the marked data stream from multiple backup nodes.

At step 410, the method 400 inquires if the next marker, M+1, has arrived at the receiver. If the next marker M+1 has arrived, the method 400 delivers data queued by the receiver (minus the marker M) to an application requesting the data at step 412. If the next marker M+1 has not arrived, the method 400 continues to queue data over the new connection from the backup node. Those skilled in the art will recognize that steps 408-412 of the method 400 are steps typically executed by a receiver node; they have been discussed here, in the context of the method 400, to illustrate the method by which the receiver mode may implement such steps in conjunction with the recovery of lost data.

The method 400 is therefore able to repair failures accurately and efficiently by resuming data transmission at the point of interruption. Moreover, as the repair only requires communication with a nearby forwarding/backup node, repair paths are short and network load is fairly distributed. The method 400 also works at the application layer with any reliable point-to-point transport protocol, can leverage existing point-to-point protocols, and may allow reframing and multi-protocol forwarding. Thus, the method 400 works independently of transport protocols, as well as independently of data stream content.

Figure 5:
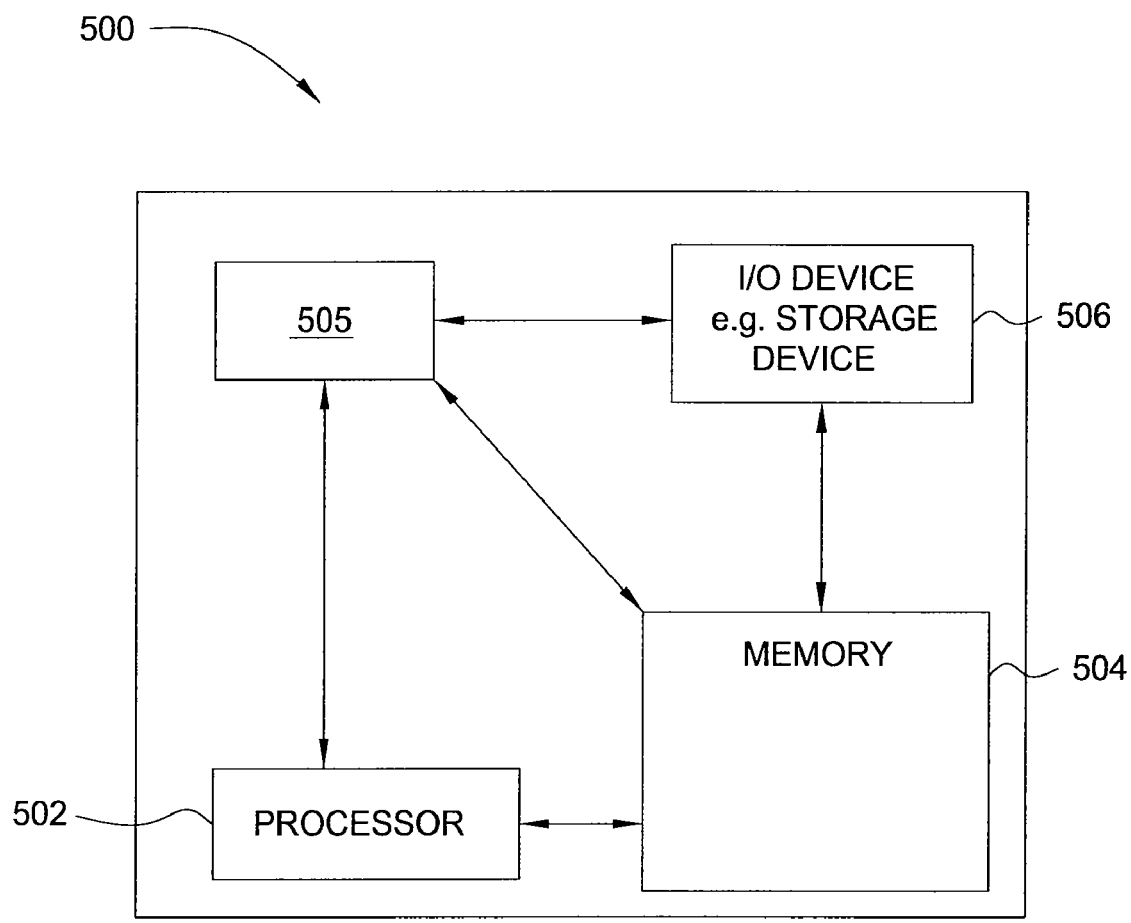
FIG. 5 is a high level block diagram of the present failure-resilient forwarding system that is implemented using a general purpose computing device.

FIG. 5 is a high level block diagram of the present failure-resilient forwarding system that is implemented using a general purpose computing device 500. In one embodiment, a general purpose computing device 500 comprises a processor 502, a memory 504, a failure-resilient forwarding mechanism or module 505 and various input/output (I/O) devices 506 such as a display, a keyboard, a mouse, a modem, and the like. In one embodiment, at least one I/O device is a storage device (e.g., a disk drive, an optical disk drive, a floppy disk drive). It should be understood that the failure-resilient forwarding mechanism 505 can be implemented as a physical device or subsystem that is coupled to a processor through a communication channel.

Alternatively, the failure-resilient forwarding mechanism 505 can be represented by one or more software applications (or even a combination of software and hardware, e.g., using Application Specific Integrated Circuits (ASIC)), where the software is loaded from a storage medium (e.g., I/O devices 506) and operated by the processor 502 in the memory 504 of the general purpose computing device 500. Thus, in one embodiment, the failure-resilient forwarding mechanism 505 and the associated methods described herein with reference to the preceding Figures can be stored on a computer readable medium or carrier (e.g., RAM, magnetic or optical drive or diskette, and the like).

Although the methods described herein have been discussed with reference to system recovery from node failures, those skilled in the art will appreciate that the present invention may have other applications in the field of content delivery. For example, the present invention may be implemented to assure reliable data delivery with any network reconfiguration, and for any reason. Other reconfiguration techniques may include finding a backup node using a centralized or distributed registry of nodes (e.g., a known server or a Domain Name Service (DNS) lookup), a distributed hash table lookup, or a broadcast search, among others. Other reasons for network reconfiguration may include responding to performance degradation, optimization of network resource utilization and load balancing, among others.

Thus, the present invention represents a significant advancement in the field of content delivery. A method and apparatus are provided that enable efficient, failure-resilient forwarding of data over a network. The network is able to accurately and efficiently resume data transmission at the point of interruption, without transmitting redundant or out-of-order data to a receiver. To an application requesting data from a sender, the failure and recovery of the system are substantially transparent. Moreover, the methods of the present invention are not application specific, but may be adapted for use with any type of data stream, regardless of content, and with any type of reliable transport protocol.

While foregoing is directed to the preferred embodiment of the present invention, other and further embodiments of the invention may be devised without departing from the basic scope thereof, and the scope thereof is determined by the claims that follow.

The invention claimed is:

1. A method for resuming interrupted transport of a marked data stream over a network from a sender node to a receiver node, the marked data stream comprising data and one or more markers, the method comprising:
  detecting, by the receiver node, a failure at a first intermediate node through which a first portion of the marked data stream passed from the sender node to the receiver node;
  connecting, by the receiver node, to a second intermediate node in the network; and
  requesting, by the receiver node, a second portion of the marked data stream from the second intermediate node, the second portion of the marked data stream starting at a specific one of the one or more markers specified by the receiver node.

2. The method of claim 1, further comprising:
  resetting, by the receiver node, a receiver queue write pointer to a position immediately following the specific one of the one or more markers; and
  queuing, by the receiver node, the second portion of the marked data stream from the second intermediate node to the receiver node.

3. The method of claim 2, further comprising:
  delivering, by the receiver node, the second portion of the marked data stream when a next marker following the specific one of the one or more markers is received from the second intermediate node, wherein the second portion of the marked data stream is delivered to an application.

4. The method of claim 1, wherein said requesting comprises:
  specifying, by the receiver node, a unique identifier for the specific one of the one or more markers, wherein the unique identifier is associated with a position of the specific one of the one or more markers in a local buffer of the second intermediate node.

5. The method of claim 1, further comprising:
  overwriting, by the receiver node, data following the specific one of the one or more markers in a local buffer of the receiver node, wherein the data following the specific one of the one or more markers is overwritten with the second portion of the marked data stream.

6. The method of claim 1, wherein the second intermediate node precedes the first intermediate node in a path from the sender node to the receiver node.

7. The method of claim 1, wherein the second intermediate node is a sister node of the first intermediate node.

8. The method of claim 1, wherein each of the one or more markers comprises a recognizable bit field having a unique identifier.

9. The method of claim 1, wherein the receiver node locally stores the one or more markers.

10. The method of claim 1, wherein the one or more markers are injected into the marked data stream by an intermediate node residing on a path over which the marked data stream passes from the sender node and the receiver node.

11. A computer readable storage device containing an executable program for resuming interrupted transport of a marked data stream over a network from a sender node to a receiver node, the marked data stream comprising data and one or more markers, where the program performs:
  detecting, by the receiver node, a failure at a first intermediate node through which a first portion of the marked data stream passed from the sender node to the receiver node;

connecting, by the receiver node, to a second intermediate node in the network; and requesting, by the receiver node, a second portion of the marked data stream from the second intermediate node, the second portion of the marked data stream starting at a specific one of the one or more markers specified by the receiver node.

12. The computer readable storage device of claim 11, further comprising:

resetting, by the receiver node, a receiver queue write pointer to a position immediately following the specific one of the one or more markers; and queuing, by the receiver node, the second portion of the marked data stream from the second intermediate node to the receiver node.

13. The computer readable storage device of claim 12, further comprising:

delivering, by the receiver node, the second portion of the marked data stream when a next marker following the specific one of the one or more markers is received from the second intermediate node, wherein the second portion of the marked data stream is delivered to an application.

14. The computer readable storage device of claim 11, wherein said requesting comprises:

specifying, by the receiver node, a unique identifier for the specific one of the one or more markers, wherein the unique identifier is associated with a position of the specific one of the one or more markers in a local buffer of the second intermediate node.

15. The computer readable storage device of claim 11, further comprising:

overwriting, by the receiver node, data following the specific one of the one or more markers in a local buffer of the receiver node, wherein the data following the specific one of the one or more markers is overwritten with the second portion of the marked data stream.

16. A system for resuming interrupted transport of a marked data stream over a network from a sender node to a receiver node, the marked data stream comprising data and one or more markers, comprising:

means for detecting, by the receiver node, a failure at a first intermediate node through which a first portion of the marked data stream passed from the sender node to the receiver node;

means for connecting, by the receiver node, to a second intermediate node in the network; and means for requesting, by the receiver node, a second portion of the marked data stream from the second intermediate node, the second portion of the marked data stream starting at a specific one of the one or more markers specified by the receiver node.

17. The system of claim 16, further comprising:

means for resetting, by the receiver node, a receiver queue write pointer to a position immediately following the specific one of the one or more markers; and means for queuing, by the receiver node, the second portion of the marked data stream from the second intermediate node to the receiver node.

18. The system of claim 17, further comprising:

means for delivering, by the receiver node, the second portion of the marked data stream when a next marker following the specific one of the one or more markers is received from the second intermediate node, wherein the second portion of the marked data stream is delivered to an application.

19. The system of claim 16, wherein said means for requesting specifies a unique identifier for the specific one of the one or more markers, and looks up the specific one of the one or more markers in a local buffer of the second intermediate node.

20. The system of claim 16, further comprising:

means for overwriting, by the receiver node, data following the specific one of the one or more markers in a local buffer of the receiver node, wherein the data following the specific one of the one or more markers is overwritten with the second portion of the marked data stream.

* * * * *